United States Patent Office 3,402,182
Patented Sept. 17, 1968

3,402,182
METHOD OF ISOLATING AND REFINING TOCOPHEROL HOMOLOGUES
Shizumasa Kijima, Toyota, Hino-shi, Tokyo, and Tetsuya Nakamura, Kamikizaki, Urawa-shi, Saitama, Japan, assignors to Eisai Co., Ltd., Tokyo, Japan, a corporation of Japan
No Drawing. Filed Apr. 28, 1966, Ser. No. 545,830
7 Claims. (Cl. 260—345.6)

ABSTRACT OF THE DISCLOSURE

A process for separating from one another the individual members of a tocopherol homologue mixture including $\alpha$-tocopherol, $\beta$-tocopherol, $\gamma$-tocopherol and $\delta_5$-tocopherol in which the tocopherol homologue mixture is adsorbed on an OH-type basic anion exchange resin. A self-dissociating solvent is then passed through the resin thereby eluting, first, the $\alpha$-tocopherol and the $\beta$-tocopherol or $\gamma$-tocopherol. Afterwards, a solution of the self-dissociating solvent and an acid is passed through the resin, thereby eluting the $\delta$-tocopherol.

---

This invention relates to a method of separating a tocopherol homologue mixture into respective single components by using a basic anion exchange resin.

Seven kinds of tocopherol homologues have been discovered in natural oils. They exist usually as a mixture of two or more kinds. For example, $\alpha$-tocopherol, $\gamma$-tocopherol and $\delta$-tocopherol are contained in soybean oil and poppy-seed oil, $\alpha$-tocopherol and $\gamma$-tocopherol are contained in cottonseed oil, rapeseed oil and corn oil and $\alpha$-tocopherol and $\beta$-tocopherol have been discovered in wheat germ oil.

As methods of separating such tocopherol homologues, there have been discovered such effective methods as reversed phase paper chromatography, thin layer chromatography and gas chromatography. However, though each of such separating methods is suited for analytical or experimental purposes, only a very small amount of a sample can be treated thereby. There has not yet been known any method of isolating such homologues cheaply on an industrial scale.

We have found that these tocopherol homologues show respective different acidities though very slight in a weakly self-dissociating solvent (solvents which have a tendency to release protons in a slight degree), such as methanol and allyl alcohol, and have succeeded in isolating respective tocopherols from a tocopherol homologue mixture by combining the use of a self-dissociating solvent with the use of a basic anion exchange resin.

The method of the present invention comprises passing a solution of a tocopherol homologue mixture in a self-dissociating solvent such as methanol and allyl alcohol through an OH-type basic anion exchange resin column immersed in said self-dissociating solvent and further passing said self-dissociating solvent through said resin, thereby eluting first $\alpha$-tocopherol the weakest in acidity from the resin and then $\beta$-tocopherol and $\gamma$-tocopherol. $\delta$-Tocopherol, the strongest in acidity, will not be eluted from the resin by simply passing the self-dissociating solvent. The method of the present invention further comprises passing a solution of such acid as acetic acid in the self-dissociating solvent, through the column thus eluting $\delta$-tocopherol from the resin. By removing the solvent from the respective fractions, tocopherol homologues having high purity can be isolated respectively. $\beta$-Tocopherol and $\gamma$-tocopherol will be obtained respectively in fractions which are close to each other. However, this fact is no obstacle to the working of the present invention at all, because there has been discovered no natural oil containing both $\beta$-tocopherol and $\gamma$-tocopherol simultaneously.

The self-dissociating solvents to be used in the present invention are methanol, allyl alcohol and their mixture. Methanol is most preferable. The ion exchange resin to be used in the present invention must be strongly basic and is preferably porous. Among the commercial ion exchange resins having these properties are Dowex 1–X1, Dowex 1–X2, Dowex 1–X4, Dowex 2–X4 (Dow Chemical Co.), Amberlite IRA–401, Amberlite IRA–411 (Rhom and Haas), Diaion SA–101, Diaion SA–201 (Mitsubishi Chemical Ind. Ltd.), Duolite A–40LC and Duolite A–42LC (Chemical Process Co.), etc. These commercial ion exchange resins are sold usually as a chlorine type. Therefore, prior to the operation for separating tocopherol homologues, such commercial resins must be treated with an aqueous solution of 5 to 10% alkali hydroxide in order to convert the ion type to an OH type and then the self-dissociating solvent must be passed through the resin so as to replace the water.

The acid to be used to elute $\delta$-tocopherol may be either inorganic acid or organic acid. However, an organic acid is preferable. Particularly, acetic acid gives good results.

Examples of the present invention are given in the following.

Example 1

A glass column (3 cm. x 90 cm.) was charged with 5500 ml. of Dowex 1–X2 (50 to 100 meshes). Five liters of an aqueous solution of 4% sodium hydroxide were passed through the resin, converting the ion type of the resin to OH type. The resin was then washed with distilled water until the washing solution became neutral. Then one liter of methanol was passed concurrently through the column in order to replace the water with the solvent. Sixty-two grams of concentrated soybean oil (total tocopherol concentration was 96.8%; as a result of quantitative determination by using a thin layer chromatography, the tocopherol homologue composition was found to consist of 9% of $\alpha$-tocopherol, 58% $\gamma$-tocopherol and 33% $\delta$-tocopherol) dissolved in 50 ml. of methanol were passed through the column, 10.5 liters of methanol were then passed through so that $\alpha$-tocopherol and $\gamma$-tocopherol are eluted respectively and isolated and then one liter of acidic methanol contining 5% acetic acid was passed through in order to elute $\delta$-tocopherol.

The results are shown in the following table:

| Eluted Fraction | Effluent | Amount of the Effluent (l.) | Weight of the Oil (g.) | Purity of the Tocopherol in percent | Thin layer Chromatography |
|---|---|---|---|---|---|
| Raw material | | | 62.0 | 96.8 | $\alpha$, $\gamma$ and $\delta$-Tocopherols. |
| Fraction 1 | Methanol | 0.3 | 2.7 | 37.6 | $\alpha$-Tocopherol. |
| Fraction 2 | do | 1.2 | 4.3 | 93.1 | Do. |
| Fraction 3 | do | 1.5 | 3.5 | 99.4 | $\alpha$ and $\gamma$-Tocopherols. |
| Fraction 4 | do | 4.5 | 27.2 | 99.1 | $\gamma$-Tocopherol. |
| Fraction 5 | do | 3.0 | 4.5 | 99.3 | Do. |
| Fraction 6 | 5% acetic acid-methanol | 1.0 | 20.1 | 97.5 | $\delta$-Tocopherol. |

Example 2

A glass column was charged with 75 ml. of Dowex 1–X1. Seven hundred fifty ml. of an aqueous solution of 4% sodium hydroxide were passed through the resin so that the resin is converted to an OH type. The resin was washed with water. Two hundred ml. of allyl alcohol were then passed concurrently through the column in order to replace the water with the solvent. Twenty g. of concentrated soybean oil (total tocopherol concentration was 86.5%; as a result of quantitative determination by using a thin layer chromatography, the tocopherol homologue composition was found to consist of 21.2% α-tocopherol, 45.1% γ-tocopherol and 33.7% δ-tocopherol) dissolved in 20 ml. of allyl alcohol were passed through the column, 1900 ml. of allyl alcohol were then passed through and α-tocopherol and γ-tocopherol were eluted. Then, 200 ml. of acidic allyl alcohol containing 5% acetic acid were passed through and δ-tocopherol was eluted.

The results are shown in the following table:

and α-tocopherol and δ-tocopherol were eluted respectively and isolated and then 100 liters of acidic methanol containing 3% acetic acid were passed through and δ-tocopherol was eluted.

The results are shown in the following table:

| Eluted Fraction | Effluent | Amount of the Effluent (l.) | Weight of the Oil (kg.) | Purity of the Tocopherol (percent) | Thin layer Chromatography |
|---|---|---|---|---|---|
| Raw material | | | 5.3 | 86.5 | α, γ and δ-Tocopherols. |
| Fraction 1 | Methanol | 150 | 0.811 | 28.9 | α-Tocopherol. |
| Fraction 2 | do | 300 | 0.601 | 70.1 | α and γ-Tocopherols. |
| Fraction 3 | do | 300 | 0.810 | 93.5 | Do. |
| Fraction 4 | do | 360 | 1.208 | 96.3 | γ-Tocopherol. |
| Fraction 5 | do | 360 | 0.242 | 94.9 | Do. |
| Fraction 6 | 3% acetic acid-methanol | 100 | 1.710 | 87.8 | δ-Tocopherol. |

| Eluted Fraction | Effluent | Amount of the Effluent in ml. | Weight of the Oil in g. | Purity of the Tocopherol in Percent | Thin layer Chromatography |
|---|---|---|---|---|---|
| Raw material | | | 20.0 | 86.5 | α, γ and δ-Tocopherols. |
| Fraction 1 | Allyl alcohol | 750 | 8.22 | 68.7 | α and γ-Topocopherols. |
| Fraction 2 | do | 750 | 3.91 | 97.2 | Do. |
| Fraction 3 | do | 400 | 1.25 | 96.8 | Do. |
| Fraction 4 | 5% acetic acid-allyl alcohol | 240 | 6.59 | 85.6 | δ-Tocopherol. |

Example 3

A multistep glass column (of three steps) having a diameter of 20 cm. was charged with 30 liters of Dowex 1–X2 (50 to 100 meshes). Three hundred liters of an aqueous solution of 4% sodium hydroxide were passed through the resin in order to convert the ion type of the resin to an OH type. The resin was then washed with distilled water until the washings became neutral. Then 60 liters of methanol were passed concurrently through the column, thus replacing the water with the solvent. Then 5.3 kg. of concentrated soybean oil (total tocopherol concentration was 86.5%; as a result of quantitative determination by using a thin layer chromatography, the tocopherol homologue composition was found to consist of 21.2% α-tocopherol, 45.1% γ-tocopherol and 33.7% δ-tocopherol) dissolved in six liters of methanol were passed through the column, 1470 liters of methanol were then passed through

We claim:

1. The process for separating a tocopherol homologue mixture into components, which comprises adsorbing a tocopherol homologue mixture dissolved in a self-dissociating solvent on an OH-type basic anion exchange resin immersed in said self-dissociating solvent; then passing a further quantity of said self-dissociating solvent as an eluant through said resin to separate and obtain α-tocopherol and a member selected from the group consisting of β-tocopherol and γ-tocopherol; then passing a solution of an acid and said self-dissociating solvent through said resin to elute and obtain δ-tocopherol; removing the solvent from the respective eluates and recovering the respective tocopherols of high purity.

2. The process of claim 1, wherein the α-tocopherol is collected in the first portions of the self-dissociating solvent which are passed through the resin and wherein the tocopherol homologue selected from the group consisting of β-tocopherol and γ-tocopherol is collected in the subsequent portions of the self-dissociating solvent which are passed through the resin.

3. The process of claim 1, wherein said self-dissociating solvent is methanol.

4. The process of claim 1, wherein said self-dissociating solvent is allyl alcohol.

5. The process of claim 1, wherein said OH-type basic anion exchange resin is strongly basic and porous.

6. The process of claim 1, wherein said acid is acetic acid.

7. The process of claim 1, wherein said tocopherol homologue mixture is a concentrated soybean oil.

References Cited

UNITED STATES PATENTS 3,122,565  2/1964  Kijima et al. _____ 260—345.6
3,153,055  10/1964  Brown et al. _____ 260—345.6

HENRY R. JILES, *Primary Examiner.*

J. M. FORD, *Assistant Examiner.*